United States Patent [19]

Tambay

[11] Patent Number: 4,986,560
[45] Date of Patent: Jan. 22, 1991

[54] ANTI-JACKKNIFING DEVICE FOR ARTICULATED ROAD VEHICLES

[76] Inventor: Jean P. Tambay, 888 Roseview Ave., Ottawa, Ontario, Canada, K2B 6J4

[21] Appl. No.: 340,076

[22] Filed: Apr. 18, 1989

[51] Int. Cl.⁵ .............................................. B62D 53/08
[52] U.S. Cl. .................................. 280/432; 280/446.1
[58] Field of Search ............. 280/432, 433, 434, 446.1

[56] References Cited

U.S. PATENT DOCUMENTS

| | | | |
|---|---|---|---|
| 3,733,090 | 5/1973 | Keller | 280/432 |
| 3,837,678 | 9/1974 | Cicero | 280/432 |
| 3,850,449 | 11/1974 | Link et al. | 280/432 |
| 4,204,700 | 5/1980 | Haines, Sr. | 280/432 |
| 4,241,934 | 12/1980 | Buehner | 280/432 |
| 4,252,336 | 2/1981 | Hubbard | 280/432 |
| 4,313,616 | 2/1982 | Howard | 280/432 X |
| 4,585,248 | 4/1986 | Miller et al. | 280/432 |
| 4,720,118 | 1/1988 | Schultz et al. | 280/432 |
| 4,756,543 | 7/1988 | Cromnow et al. | 280/432 |

Primary Examiner—Charles A. Marmor
Assistant Examiner—Alan M. Kagen
Attorney, Agent, or Firm—Thomas Adams

[57] ABSTRACT

An anti-jackknifing coupling device, for an articulated veicle such as a tractor-trailer combination, comprising a base member for mounting upon the tractor. A turntable member is rotatably mounted upon the base member, and a trailer support member is supported upon, and rotatable with, the turntable. The trailer support member, usually called a "fifth wheel", serves to releasably couple the trailer. A piston-and-cylinder device is connected at its one end to the turntable and at its other end to the base member, so that it extends substantially diametrically across the turntable member when the vehicle is straight. As the tractor and trailer pivot, the trailer support member and turntable rotate together relative to the base member, causin contraction of the piston-and-cylinder device. The trailer support member will usually be able to tilt relative to the turntable about a lateral pivot axis. The piston-and-cylinder device preferably extends in the same vertical plane as this pivot axis, when the vehicle is straight. The piston-and-cylinder device may be connected to an accumulator, conveniently containing a resilient medium to provide a restoring force as the vehicle straightens. Flow restrictors and valves restrict fluid flow as the tractor and trailer pivot out of alignment, but not when the vehicle is straightening.

16 Claims, 3 Drawing Sheets

ANTI-JACKKNIFING DEVICE FOR ARTICULATED ROAD VEHICLES

FIELD OF THE INVENTION

The invention relates to anti-jackknifing devices for articulated road vehicles, especially tractor-trailer combinations coupled together by so-called fifth wheel devices.

BACKGROUND

Various proposals have been made to prevent jackknifing of articulated vehicles. For example, U.S. Pat. No. 4,241,934, dated Dec. 30, 1980, discloses a coupling device in which a pin mounted on a plate hinged to the front of the trailer is lowered into an arcuate slot in a structure fixed to the tractor frame. The slot limits movement of the pin and hence the extent to which the trailer can pivot relative to the tractor. The plate is lowered and raised by means of an hydraulic ram attached to the front wall of the trailer. U.S. Pat. No. 3,733,090, dated May 15, 1973, discloses a pair of pins mounted on the fifth wheel cooperating with spring-loaded bumpers mounted on the trailer to limit the maximum angular relationship of the tractor and trailer. U.S. Pat. No. 4,204,700, dated May 27, 1980, discloses a pair of pneumatic cylinders mounted on the trailer and cooperating with the fifth wheel assembly mounted on the tractor. Mounting pneumatic cylinders or dampers on the trailer, as taught by these prior proposals, is an expensive way to equip an entire fleet since there are perhaps four times as many trailers as tractors.

An anti-jackknifing coupling device which confines the modifications primarily to the tractor is disclosed in U.S. Pat. No. 3,850,449, dated Nov. 26, 1974, which discloses a fluid piston-and-cylinder link fastened at one end to the tractor, at a point spaced well forward of the fifth wheel assembly, and at the other end to the upper plate of the fifth wheel, so that pivoting of the tractor and trailer from the aligned position causes contraction of the fluid piston-and-cylinder link. This still requires a piston extending a significant distance from the fifth wheel assembly to a point near the cab of the tractor, which would not facilitate movement of the fifth wheel assembly longitudinally of the tractor to optimize the load distribution between the front and rear wheels of the tractor. Also, the piston-and-cylinder device would encroach upon useful space behind the cab of the tractor.

An object of the present invention is to provide an anti-jackknifing coupling device which is relatively economical to install on a fleet of articulated vehicles.

Another object of the invention is to provide an anti-jackknifing coupling device which controls rotational movement of the articulated units while permitting movement of the coupling position to and fro along the tractor.

SUMMARY OF THE PRESENT INVENTION

According to one aspect of the present invention an anti-jackknifing coupling device for an articulated vehicle comprising a tractor-trailer combination, comprises a base member adapted for mounting upon said tractor. A turntable member is rotatably mounted upon said base member, and a trailer support member adapted to releasably couple the trailer is supported upon, and rotatable with, the turntable member. At least one piston-and-cylinder device is connected at its one end to the trailer support member of the turntable member and at its other end to the base member, the arrangement being such that relative rotation of the turntable member and the base member changes the length of the piston-and-cylinder device. Control means is operable to control said piston-and-cylinder means to inhibit pivoting of said trailer support member in at least one direction.

The piston-and-cylinder device may extend substantially diametrically across the turntable member.

The trailer support member may be pivotal relative to the turntable member about a horizontal axis and the piston-and-cylinder device may then extend in the same plane as the pivot axis i.e. laterally of the tractor. This reduces wear and tear on the piston-and-cylinder device due to tilting of the trailer support member as the vehicle traverses bumps or other undulations.

Advantageously, the cylinder may be connected to an accumulator, conveniently a pneumatic accumulator, and a valve, operable by the tractor's brakes. When the brakes are applied, the valve closes, preventing contraction of the piston and cylinder, and forcing the fluid to enter the accumulator. The accumulator acts as a shock absorber, storing fluid resiliently and damping the stoppage of the piston. When the vehicle starts to straighten, the accumulator will return the fluid to the cylinder under force, assisting the straightening operation.

Flow restrictor means may be provided in bypass to provide some resistance to piston movement when the anti-jackknifing device is not employed, i.e. the valve is open. Different degrees of resistance for the flow restrictor means may be selected by the driver and/or automatically to suit road or traffic conditions. Preferably the flow restrictor can be set to provide no restriction so that, with the valve open, fluid flow is not impeded.

The trailer support member, i.e. the so-called fifth wheel, may have locking means, for example a pin urged upwards to engage in a hole in the underside of the trailer.

In this specification the term "trailer" is used to embrace a vehicle having wheels at its rear only, its front end being supported by the tractor unit to which it is coupled.

According to a second aspect of the present invention, there is provided a tractor having an anti-jackknifing coupling according to the aforementioned first aspect.

DETAILED DESCRIPTION OF A PREFERRED EMBODIMENT

Figure 1:
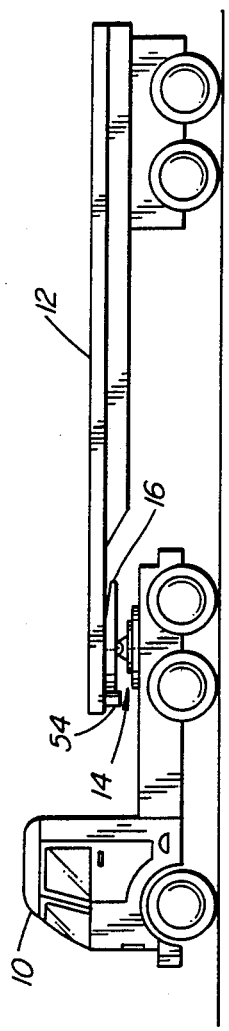
FIG. 1 is a side view of an articulated road vehicle comprising a tractor and a trailer.

Referring to FIG. 1, an articulated road vehicle comprises a tractor 10 and a trailer 12 coupled together by an anti-jackknifing coupling device 14, usally called a fifth wheel assembly. The fifth wheel assembly 14 is mounted above the rear wheels of the tractor 10 and the front end of trailer 12 rests upon a trailer support member in the form of fifth wheel 16. Referring to FIGS. 2, 3, 4, and 5, the trailer 12 has a king pin 17 (FIG. 5) which engages in a slot 18 in the trailer support member 16, so as to allow the trailer 12 to pivot relative to the tractor 10. The mouth of the slot 18 diverges outwardly as at 20.

Figure 5:
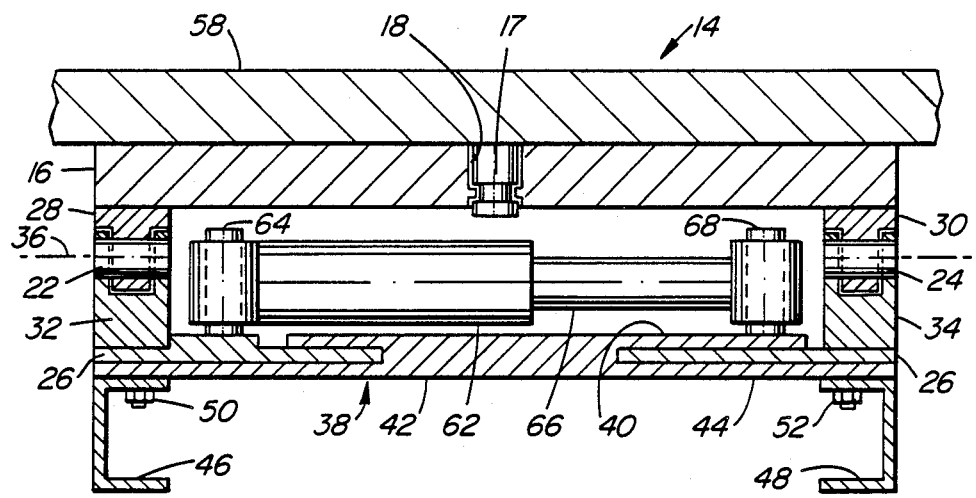
FIG. 5 is a section through the fifth wheel device shown in FIG. 2.

Referring to FIG. 5, the fifth wheel 16 is mounted by means of diametrically spaced trunnion pins 22 and 24, respectively, upon a turntable 26. Trunnion pins 22 and 24 extend through lugs 28 and 30, respectively, which depend from fifth wheel 16, and through cooperating lugs 32 and 34, respectively, upstanding from turntable 26. The trunnions 22 and 24 permit the fifth wheel 16, and hence the trailer 12, to tilt relative to the turntable 26, and hence the tractor 10, about a laterally extending axis 36. Turntable 26 is mounted upon a base member 38 comprising a flanged portion 40 which, in use, is uppermost and secured by a central boss 42 to a base 44 is lowersmost, in use. In FIG. 5, the base plate 44 is shown secured to longitudinal frame members 46 and 48 of the tractor 10 by screw threaded studs 50 and 52, respectively.

As shown more clearly in FIGS. 2,3,4, and 6, the fifth wheel 16 has a cylindrical recess 54 housing a plunger 56. When the bearing plate 58 of a suitable trailer i.e. having a corresponding hole to receive plunger 56, is resting upon trailer support plate 16, compressed air applied to cylinder 54 urges plunger 56 upwards so as to engage in the hole in the trailer bearing plate 58 and prevent rotation of the fifth wheel 16 relative to the trailer 12. If a trailer 12 without these holes is coupled, the pins 22 and 24 will not engage the trailer support plate and the trailer 12 will be allowed to pivot relative to the fifth wheel 16 in a conventional manner. In the latter case, the turntable 26 will be prevented from rotating relative to the tractor 10, as will be explained later.

The compressed air for operating the plunger 56 will be supplied from the usual compressed air system provided on such vehicles. To engage the plunger 54, the driver will operate a switch (not shown), which might be inside the cab or adjacent the fifth wheel.

Figure 4:
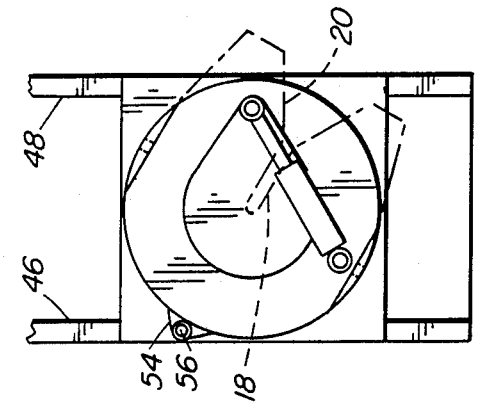
FIGS. 2, 3, and 4 are detail plan views of a so-called "fifth wheel" anti-jackknifing device coupling the tractor and trailer.
Figure 3:
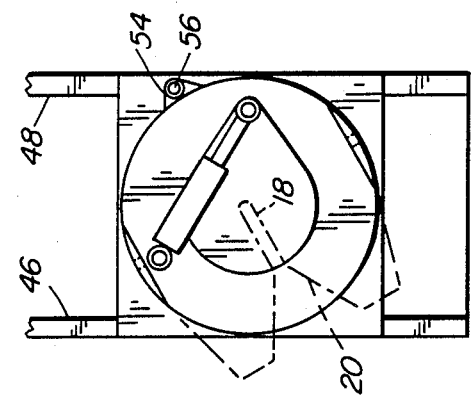
Figure 2:
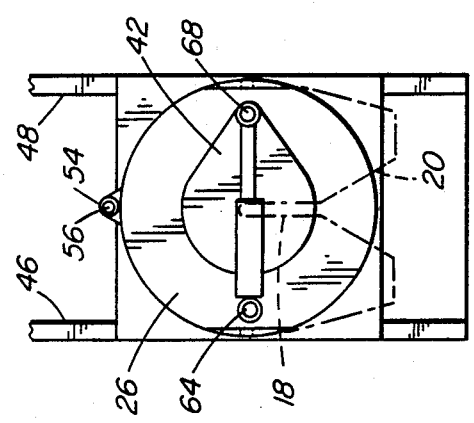

An hydraulic ram device, comprising a piston 60 and a cylinder 62, is mounted between the base member flange 40 and the turntable 26. Specifically the cylinder 62 is pivotally attached at its free end to a pin 64 upstanding from a raised portion of the turntable 26 and the piston connecting rod 66 is pivotally attached to a pin 68 upstanding from base flange 40. As shown in FIGS. 2,3 and 4, rotation of the fifth wheel 16 in either direction from the straight-ahead position of FIG. 2 will cause foreshortening of the piston-and-cylinder device.

Figure 7:
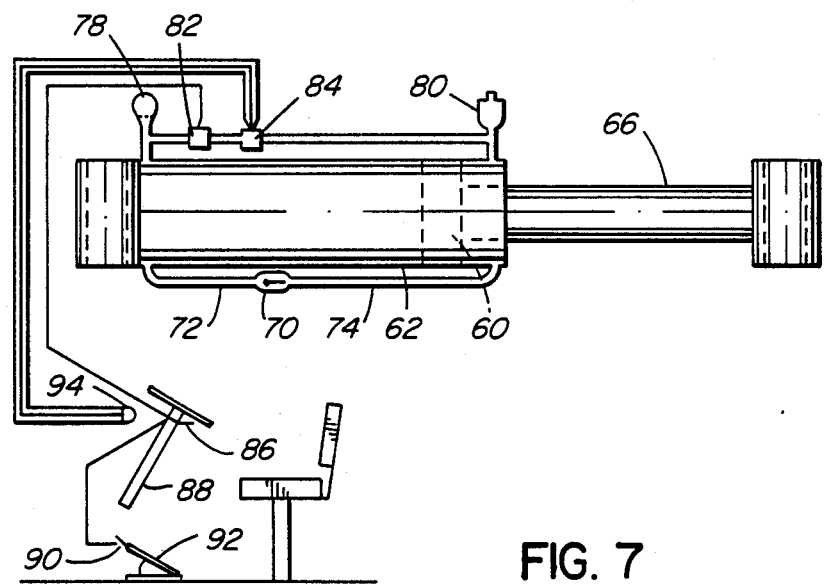
FIG. 7 illustrates electrical and hydraulic circuits associated with the fifth wheel device.
Figure 6:
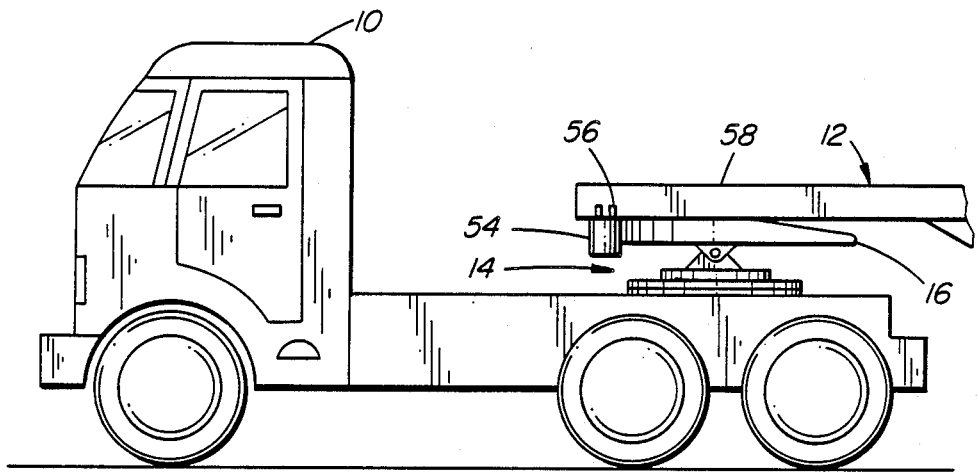
FIG. 6 corresponds to FIG. 1 but shows the tractor and fifth wheel device to a larger scale.

As shown in FIG. 7, a one-way valve 70 is coupled by hydraulic lines 72 and 74, respectively, to opposite sides of the piston 60. An accumulator 78 is coupled to the end of cylinder 62 attached to pin 64 and a reservoir 80 is coupled at its other end. Reservoir 80 compensates for the volume occupied by the connecting rod 66 of piston 60. A normally open valve 82 and a variable flow restrictor 84 are connected, in series, between the cylinder ports to which the accumulator 78 and the reservoir 80 are connected, i.e. between opposite ends of cylinder 62, as a second bypass.

When the piston 60 is being forced into cylinder 62 by pivoting of the tractor 10 relative to the trailer 12, the hydraulic fluid displaced by the piston 60 cannot return by way of one-way valve 70 and so must enter accumulator 78 and/or return by way of valve 82 (if open) and the variable flow restrictor device 84. The valve 82 is electrically operable by means of a switch 86 on the steering column 88 of the tractor 10. For purposes of illustration, a second switch 90 is shown attached to the brake pedal 92, though it would more likely be an hydraulic switch in the brake line.

Switch 90 is connected in parallel with switch 86, so valve 82 will close either when the driver applies the brakes or when he operates the switch 86 on the steering column 88. When valve 82 closes, movement of piston 76 into cylinder 62 will be arrested, since fluid cannot return via one way valve 70. Some will enter the accumulator 78, until its capacity is reached. The accumulator 78 will absorb fluid resiliently, acting as a shock absorber to dampen the stoppage of the movement of the piston and cylinder. Otherwise the jolt as the piston-and-cylinder device "locked up" might cause loss of control, especially on slippery roads.

When valve 82 is open, i.e. the brakes are not applied, fluid can flow via valve 82 and flow restrictor 84 permitting retraction of the piston 60 from the cylinder 62. The variable flow restrictor 84 has three possible states, fully open, low restriction, and high restriction, and is connected to a three-way selector switch 94 on the dashboard inside the cab. The driver may operate selector switch 94 to select either high or low resistance to retraction of the piston-and-cylinder device. This provides a certain amount of "stiffening" of the articulated vehicle, even when the anti-jackkniffing feature is not employed.

If the driver selects the fully open state, with valve 82 also open, the movement of piston 60 will not be impeded in either direction. The driver typically will select this combination when manoeuvering at low speeds. On the other hand, there may be occasions when the driver wishes to lock the piston-and-cylinder device to prevent further pivoting of the trailer 12 and tractor 10 relative to each other, in which case he may close valve 82, i.e. by operating switch 86. If he selects high or low restriction, with valve 82 open, there will be resistance to contraction of the piston 60 and cylinder 62, reducing any tendency to jackknife. This selection may be desirable in particularly slippery conditions. Retraction of the piston 60 from cylinder 62 will still be possible due to one way valve 70.

The accumulator 78 is charged with air or another suitable gaseous medium which will compress resiliently as the hydraulic fluid from the cylinder 62 enters the accumulator 78. When the force contracting the piston-and-cylinder device is removed, i.e. the driver begins to straighten the vehicle, the compressed air or gas will expel the hydraulic fluid from the accumulator 78 and, in so doing, produce a restoring force to assist straightening of the vehicle.

As mentioned previously, when a trailer is attached which has not been modified, i.e. does not have a hole in its underside to receive plunger 56, the trailer pivots relative to support plate 16. The driver can then prevent rotation of the turntable 26 relative to the tractor 10 by closing valve 82 completely when the vehicle is straight. Since the piston-and-cylinder device will not be able to contract, the turntable 26 will not be permitted to turn.

It is envisaged that more than one accumulator might be provided, perhaps coupled each to a different one of a plurality of restrictors so as to give different degrees of shock absorption as well as restriction.

I claim:

1. An anti-jackknifing coupling device for an articulated vehicle comprising a tractor-trailer combination, comprising a base member having means for mounting said base member upon said tractor, a member rotatably mounted upon said base member, a trailer support member adapted to releasably couple said trailer, said trailer support member being supported upon, and rotatable with, said rotatably mounted member, and a piston-and-cylinder device connected between said trailer support member and said base member, said piston-and-cylinder device extending substantially diametrically across said rotatably mounted member when said base member and said rotatable member are in a position corresponding to alignment of said tractor-trailer combination, the arrangement being such that rotation of said trailer support member and rotatably mounted member relative to said base member contracts said piston-and-cylinder device, said coupling device further comprising means for inhibiting contraction of said piston-and-cylinder means.

2. An anti-jackknifing coupling device as claimed in claim 1, wherein said trailer support member is pivotal relative to said rotatably mounted about an axis extending laterally thereof, and said piston-and-cylinder device is arranged to extend in substantially the same vertical plane as such pivotal axis, when the tractor-trailer combination is aligned.

3. An anti-jackknifing coupling device as claimed in claim 2, wherein said piston-and-cylinder device is connected to an accumulator comprising a resilient medium, compression of said resilient medium producing a restoring force acting to return said piston.

4. An anti-jackknifing coupling device as claimed in claim 3, wherein said piston-and-cylinder device is hydraulic and said resilient medium is pneumatic.

5. An anti-jackknifing coupling device as claimed in claim 2, further comprising flow restrictor means in a conduit connected to said cylinder at opposite sides of said piston, said means for controlling being operable to selectively employ said flow restrictor means so as to provide different degrees of resistance to pivoting of the tractor and trailer relative to each other.

6. An anti-jackknifing coupling device as claimed in claim 5, further comprising a one-way valve so disposed as to permit passage of fluid from behind said piston, as it retracts, to ahead of said piston.

7. An anti-jackknifing coupling device as claimed in claim 5 or 6, wherein said means for controlling comprises a valve in line with said flow restrictor means and operable to close said conduit in response to operation of the tractor brakes.

8. An anti-jackknifing coupling device as claimed in claim 1, wherein said trailer support means comprises locking means for engaging a trailer coupled thereto and preventing rotation of said trailer support means relative to the trailer.

9. A tractor comprising an anti-jackknifing coupling device for coupling a trailer, said coupling device comprising a base member having means for mounting said base member upon said tractor, a member rotatably mounted upon said base member, a trailer support member adapted to releasably couple said trailer, said trailer support member being supported upon, and rotatable with, said rotatably mounted member, and piston-and-cylinder device connected between said trailer support member and said base member, said piston-and-cylinder device extending substantially diametrically across said rotatable member when said base member and rotatable member are in a position corresponding to alignment of said tractor trailer, the arrangement being such that rotation of said trailer support member and rotatably mounted member relative to said base member contracts said piston-and-cylinder device, said tractor further comprising means for inhibiting contraction said piston-and-cylinder means.

10. A tractor as claimed in claim 1, further comprising flow restrictor means in a conduit communicating with said cylinder at opposite sides of said piston, said means for controlling being operable to selectively employ said flow restrictor means so as to provide different degrees of resistance to pivoting of the tractor and trailer relative to each other.

11. A tractor as claimed in claim 10, wherein said flow restrictor means is operable selectively to provide different degrees of restriction to fluid flow, said tractor further comprising selector means operable by a driver to preselect said degree of restriction.

12. An anti-jackknifing coupling device as claimed in claim 10, further comprising a one-way valve so disposed as to permit passage of fluid from behind said piston, as it retracts, to ahead of said piston.

13. A tractor as claimed in claim 11 or 12, wherein said means for controlling further comprises a valve in line with said flow restrictor means in said conduit, said valve being operable to close said conduit in response to operation of the tractor brakes.

14. A tractor as claimed in claim 10, wherein said trailer support means comprises locking means for preventing rotation of said trailer support means relative to the trailer.

15. A tractor as claimed in claim 9, wherein said piston-and-cylinder device is connected to an accumulator comprising a resilient medium, compression of said medium providing a restoring force to return said piston.

16. a tractor as claimed in claim 15, wherein said piston-and-cylinder device is hydraulic and said resilient medium is pneumatic.

* * * * *